J. H. WOOLL.
ELECTRIC SWITCH.
APPLICATION FILED OCT. 28, 1909.
976,422.
Patented Nov. 22, 1910.
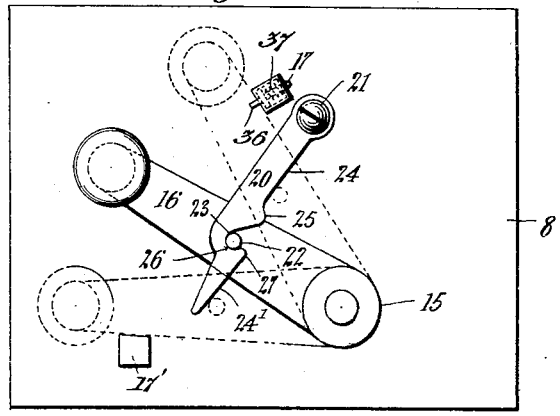
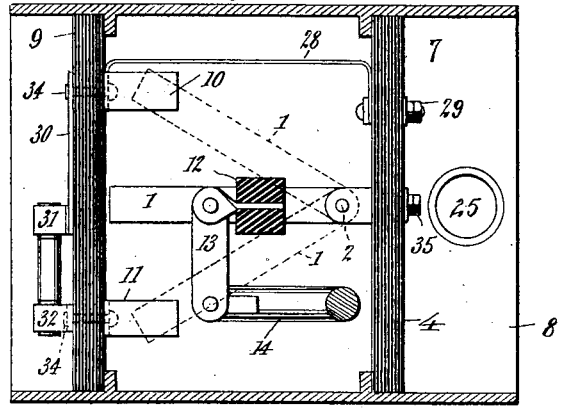

UNITED STATES PATENT OFFICE.

JOHN HASTINGS WOOLL, OF SAN FRANCISCO, CALIFORNIA.

ELECTRIC SWITCH.

976,422.   Specification of Letters Patent.   Patented Nov. 22, 1910.

Application filed October 28, 1909. Serial No. 525,006.

*To all whom it may concern:*

Be it known that I, JOHN H. WOOLL, a citizen of the United States, residing at San Francisco, in the county of San Francisco and State of California, have invented certain new and useful Improvements in Electric Switches, of which the following is a full, clear, and exact description.

This invention relates to starting switches, particularly for alternating current motors, and consists in a very simple arrangement by which all the purposes of more complicated installations hitherto used are substantially realized.

Among the conditions of use of an alternating current or other motor, it is necessary that the circuit be protected by suitable fuses to guard against damage to the motor, resulting from a too heavy load, and for various other protective purposes well understood, and which need not be recited. But it happens that for the purpose of starting an alternating current motor, a very much heavier current is required, and is furthermore normally absorbed, assuming that the circuit from which current is supplied is of a character adapted to permit such extra flow or rush of current. The effect of the heavy rush of current on the alternating current motor is to start the same with a reasonably powerful turning moment or torque, and when once started the internal re-actions of the motor automatically choke or cut down the current flow to its normal value. Thus assuming that the motor is properly started into movement, no harm results from the momentary heavy rush of current, it being evident that current, even though very heavy, cannot carry sufficient heat energy to elevate the temperature of a closely wound rotor to the fusion point provided the time or period of action is sufficiently limited. But such a very heavy current will blow a fuse or open a circuit breaker, because these devices are not adapted to permit the momentary passage of a very heavy current. The foregoing shows the difficulty in present practice because the supply circuits must necessarily be protected and the protection by ordinary fuses or circuit breakers will not permit the momentary rush of current which is required for starting the motor.

Special forms of fuses and circuit breakers have been devised to overcome the foregoing difficulties, but these are expensive and complicated. I propose to overcome the difficulty by a form of starting switch having means for temporary cutting out the fuses altogether while the motor is being started.

In the drawings: Figure 1 is a side elevation of the switch casing showing the operating mechanism. Fig. 2 is a vertical section through the casing; and Fig. 3 is a horizontal section through the casing.

Referring to the drawings in which like parts are designated by the same reference sign, 1 designates a switch blade, lever or element, of which one or any number may be provided, adapted for example to a single pole or double pole control of a single phase alternating current or a three phase alternating current. In the drawings I have illustrated three such blades 1 controlling the separate leads of a three wire circuit. I have illustrated these blades journaled on the line of a common axis 2 to clips 3 fixed to the supporting frame parts. This manner of support of the blades is similar to the usual double pole and three pole switch. In the particular construction illustrated, the U-shaped clips 3 are secured to insulating bars 7 extending vertically in a box or casing 8 in which they are secured.

9 designate similar and parallel insulating bars in the general plane of movement of the switch blades 1. Each of the bars 9 carries two spring clips 10, 11, which embrace the switch blades at their extreme positions of movement and make electrical connection therewith.

12 denotes a block or bar of insulating material, which rigidly joins together all the switch blades 1. This block has a link connection 13 with a crank 14 journaled in the casing at 15 and having an operating handle 16 outside the casing. This handle moves between two lugs 17, 17' on the casing, determining its extreme positions, and correspondingly the extreme positions of the switch blades.

20 denotes a latch forming part of my invention and having an important operation in the action of the switches. Latch 20 may be made in different ways, but I prefer a pivoted finger depending diagonally from its pivot point 21 on the casing, in the general direction of throw of the handle 16. This latch or finger is maintained in this diagonal position against gravity or any equivalent force, by a pin 22 on the handle 16 upon which the finger 20 is adapted to press at all positions of the handle. At the extreme positions of the handle there are provided straight faces 24, 24' on the latch, adapted to engage the pin 22, but at an intermediate portion of the latch there is a rounded protuberance 25 and a deep notch 23 immediately beneath said protuberance. The underside of the notch 26 is curved or rounded outward to form in effect a hook 27. The upper lug 17 which serves to limit the movement of the movable switch parts also serves to limit the upward movement of the latch.

The circuits of the device are established through suitable conductors (not shown) which lead from the source of current supply into the casing 8, through conduit pipes, or the like, at the openings 25.

29 denotes binding posts supported on the uprights 7 and strapped by the metallic ribbons 28 to the terminal clips 10. 30 are additional straps or metallic ribbons joining the clips 10 to upper fuse terminals 31. The lower fuse terminals 32 are electrically connected to the clips 11. The straps 30 are joined to the clips 10 and fuse terminals 32 by bolts 34, which mechanically join and support the structures.

35 denotes binding posts in permanent electrical connection with the various switch blades 1, being in fact the extremities of the bolts which support the clips 3.

The use and operation is as follows: While the motor is idle, the switch blades 1 remain at an intermediate position between the clips 10 and 11, and which is horizontal in the illustration. At this time pin 22 is received in the notch 23 of the latch 20, and is sustained against falling by the engagement of the hook portion 27 of the latch. If now the operator desires to start the motor, the handle 16 is moved from its normal position. Owing to the engagement of the latch as just described, a downward movement of the switch blades, which might be ignorantly or carelessly given in the absence of such holding device, is prevented, and the fuses saved from being blown. An upward movement is, however, possible and at the completion of this upward movement the motor is directly connected to the mains without any intervening fuses. This permits the momentary rush which is requisite for starting the motor, such rush however being automatically checked by the action of the motor itself as soon as running conditions have been attained. The handle may now be allowed to fall by gravity, or may be moved downward, and the form of the latch 24 is such that it will be thrown outward momentarily while the pin 22 is passing the notch 26, so that the pin will not be arrested in this notch, but will descend with the switch blades to the lowermost position as shown, which is the normal running position. In this position the fuses are included in the circuit. Whenever the motor is to be stopped, the handle 16 is elevated until it is engaged by the latch and held as first described, this being the non-running or open circuit position.

With this arrangement fuses of less capacity than are required for the starting current can be used and the awkward wire usually accompanying this type of switch is avoided. A momentary contact at the upper position is sufficient to start the motor and the switch cannot be left in the starting position or started from the running position. The switch cannot be inadvertently left in its upper or starting position by reason of the spring pressed pin 36, which is positioned in the lug 17; the spring 37 thereof normally urging the pin into the position shown in Fig. 1, which hence automatically tends to move the switch from starting toward running position when the handle is released. Gravity of course tends to aid the spring 37 in this action.

What I claim, is:—

1. A double throw switch having contacts and a plurality of independently mounted blades, a plurality of independent insulating supports for said blades, an insulating structure connecting said blades, an independently mounted operating lever, and means for connecting said lever and said structure whereby movement of the lever may effect a corresponding movement of the switch blades.

2. A motor starting switch having a plurality of independently mounted blades, a plurality of independent insulating supports for said blades, an insulating structure connecting said blades, a plurality of sets of independently mounted clips adapted for engagement with said blades, a plurality of insulating supports for said clips, each of said supports carrying a cut-out device, connections between each cut-out device, and a pair of clips, an independently mounted operating lever and means for connecting said lever and said structure whereby sufficient movement of said lever in one direction or the other will correspondingly effect the engagement of said blades with one or the other set of clips.

3. A motor starting switch having two positions, one the starting position and the other the running position, the movable switch parts being movable by gravity unrestrainedly downward from said starting position to said running position, a latch coöperating with said switch to hold it normally in an intermediate position, but ineffective when the switch is allowed to fall from the starting to the running position, said switch being free from restraint when so moving, and lugs for limiting the movement of said switch parts, one of said lugs also serving to limit the movement of said latch.

In witness whereof, I subscribe my signature, in the presence of two witnesses.

JOHN HASTINGS WOOLL.

Witnesses:
 FRANK L. OWEN,
 OTTO OELLRICH.